(12) United States Patent
Park et al.

(10) Patent No.: US 12,036,848 B2
(45) Date of Patent: Jul. 16, 2024

(54) WINDOW SHADING APPARATUS HAVING INSTALLATION WIDTH ADJUSTMENT FUNCTION

(71) Applicant: KOREA FUEL-TECH CORPORATION, Anseong (KR)

(72) Inventors: Jeong Soon Park, Pyeongtaek (KR); Bong Jung Kim, Anseong (KR); Jung Tae Kim, Pyeongtaek (KR)

(73) Assignee: KOREA FUEL-TECH CORPORATION, Anseong (KR)

( * ) Notice: Subject to any disclaimer, the term of this patent is extended or adjusted under 35 U.S.C. 154(b) by 410 days.

(21) Appl. No.: 17/434,345

(22) PCT Filed: May 10, 2019

(86) PCT No.: PCT/KR2019/005636
§ 371 (c)(1),
(2) Date: Aug. 26, 2021

(87) PCT Pub. No.: WO2020/226216
PCT Pub. Date: Nov. 12, 2020

(65) Prior Publication Data
US 2022/0153095 A1    May 19, 2022

(30) Foreign Application Priority Data

May 7, 2019 (KR) .................. 10-2019-0053168

(51) Int. Cl.
*E06B 9/78* (2006.01)
*B60J 1/20* (2006.01)

(52) U.S. Cl.
CPC .......... *B60J 1/2044* (2013.01); *B60J 1/2041* (2013.01); *B60J 1/2019* (2013.01)

(58) Field of Classification Search
CPC ...... B60J 1/2041; B60J 1/2019; B60J 1/2027; B60J 1/2013; B60J 1/208; B60J 1/2052; E06B 9/78; F16G 11/08; F16G 13/10
See application file for complete search history.

(56) References Cited

U.S. PATENT DOCUMENTS

| 9,004,146 | B2 * | 4/2015 | Zeo | .......... B60J 7/0015 296/214 |
| 2012/0048488 | A1 * | 3/2012 | Oh | .......... B60J 1/208 160/370.22 |

(Continued)

FOREIGN PATENT DOCUMENTS

| KR | 20-1997-0004323 Y1 | 5/1997 |
| KR | 20-2012-0115151 A | 10/2012 |

(Continued)

*Primary Examiner* — Abe Massad
*Assistant Examiner* — Matthew R. Shepherd

(57) ABSTRACT

The present invention relates to a window shading apparatus comprising a blind sheet module including a blind sheet which is unwound when pulled in a wound state so as to cover a window of a vehicle and a pair of guide rails, each having one side connected to one side of the blind sheet module, the guide rails respectively guiding movements of the pair of cord units. Each of the guide rails includes a location adjusting unit which is to be fixed after a connecting location with respect to the blind sheet module is adjusted. The window shading apparatus capable of adjusting the installation width according to the present invention can adjust the width corresponding to an installation space, in particular, the installation width, while maintaining the operating performance of the shading apparatus at the same level, thereby improving completeness thereof.

10 Claims, 27 Drawing Sheets

(56) References Cited

U.S. PATENT DOCUMENTS

| | | | | |
|---|---|---|---|---|
| 2012/0048489 A1* | 3/2012 | Oh | ................ | B60J 1/2025 |
| | | | | 160/370.22 |
| 2015/0224857 A1* | 8/2015 | Calkins | ............ | B60J 1/2052 |
| | | | | 160/266 |
| 2016/0286969 A1* | 10/2016 | Lu | ................ | A47C 17/86 |
| 2017/0349035 A1* | 12/2017 | Tran | ............ | B60J 1/2025 |
| 2023/0302879 A1* | 9/2023 | Kim | ............ | B60J 1/2052 |

FOREIGN PATENT DOCUMENTS

| | | | |
|---|---|---|---|
| KR | 20120115151 | * | 10/2012 |
| KR | 101207990 B1 | | 12/2012 |
| KR | 101286982 B1 | * | 7/2013 |
| KR | 101426713 B1 | | 8/2014 |

* cited by examiner

WINDOW SHADING APPARATUS HAVING INSTALLATION WIDTH ADJUSTMENT FUNCTION

TECHNICAL FIELD

The disclosure relates to a window shading apparatus, and more particularly to a window shading apparatus, of which width is adjustable corresponding to an installation space of a vehicle.

BACKGROUND ART

Taking design or the like into account, a window having a relatively large area has recently been installed in a vehicle. The vehicle with the window having such a large area has an effect on satisfying aesthetic requirements of purchasers and users.

The window having the large area in the vehicle gives an improved aesthetic impression to the users of the vehicle, but causes a problem that an air conditioner is highly likely to be overloaded because heat accumulated inside the vehicle by light passing through the window having the large area increases the internal temperature of the vehicle. Further, the window having the large area makes it easy to see into the interior of the vehicle, and thus causes a problem of being inadequate to protection of privacy.

To solve the foregoing problems, there has been used a window shading apparatus capable of reducing the amount of light introduced into the interior of the vehicle but also shielding the interior of the vehicle from the outside.

In regard to such a window shading apparatus, Korean Patent No. 1,426,713 (published on Aug. 6, 2014) has been disclosed. However, such a conventional window shading apparatus has a problem that exactness of installation is decreased because its width is not adjustable according to installation spaces of vehicles. Further, a problem of low completeness arises because the installation is performed without coping with size errors that vehicles have even though the vehicles are of the same model.

DISCLOSURE

Technical Problem

The disclosure is conceived to solve the conventional problems, and an aspect of the disclosure is to provide a window shading apparatus, of which width is adjustable corresponding to an internal installation space of a vehicle.

Technical Solution

To achieve the aspect of the disclosure, there is provided a window shading apparatus including a blind sheet module including a blind sheet unfolded to cover a window of a vehicle as pulled outward in a folded state; a pair of cord units receiving actuation force to pull and unfold the blind sheet; and a pair of guide rails respectively connected to opposite sides of the blind sheet module at one sides thereof to respectively guide the pair of cord units to move, each guide rail including a position adjuster fastened after a connection position is adjusted with regard to the blind sheet module.

Here, the blind sheet module may include: a shaft formed as extended in a widthwise direction to roll up the blind sheet thereon; a frame formed as extended in the widthwise direction to accommodate the shaft and at least a part of the rolled-up blind sheet; and a pair of frame covers connected and fastened to the shaft and the frame at opposite sides of the frame in the widthwise direction, the position adjuster including at least one connector extended to have a predetermined length to connect with one side of the frame.

Meanwhile, the connector and the frame may be connected by fitting.

Further, at least one of the connectors may include a projection protruding in a direction perpendicular to the extending direction, the frame may include a projection accommodating groove to accommodate the projection at a position of connection with the position adjuster, and the fitting may include fitting of the projection to the projection accommodating groove.

Furthermore, the projection accommodating groove may be formed to have a length corresponding to a position adjustable distance so as to prevent the projection from being separated when the connection position of the position adjuster is adjusted.

Meanwhile, the projection is formed to protrude in an outward direction.

Meanwhile, the window shading apparatus may further include a fastener to fasten the connector and the frame in a state that the connection position of the position adjuster is adjusted.

Further, the frame and at least one of the connectors may include fastening holes in which the fastener is penetrated and inserted, and at least one fastening hole of the frame and the connector may include an elongated hole extended in a lengthwise direction.

Meanwhile, the connector may be fitted to the frame by penetrating the frame cover in the widthwise direction, and the frame cover may include at least one connector insertion hole formed in the widthwise direction to insert the connector therein.

Further, the frame cover may be provided to surround at least a part of the frame from outside, the connector may be fitted to an inside of the frame, and the fastener may penetrate and fasten all the frame cover, the frame and the connector.

Meanwhile, the fastener may be fastened after the position adjuster is adjusted in position corresponding to an error of an individual installation space when installed in the vehicle.

Further, at least a part of the frame cover may be inserted in and fitted to an inside of the frame, or provided to surround at least a part of the frame.

Advantageous Effects

A window shading apparatus with an adjustable installation width according to the disclosure improves completeness because the width is adjustable corresponding to an installation space, in particular, the installation width while keeping the same operation performance of the shading apparatus.

MODE FOR CARRYING OUT DISCLOSURE

Figure 1:
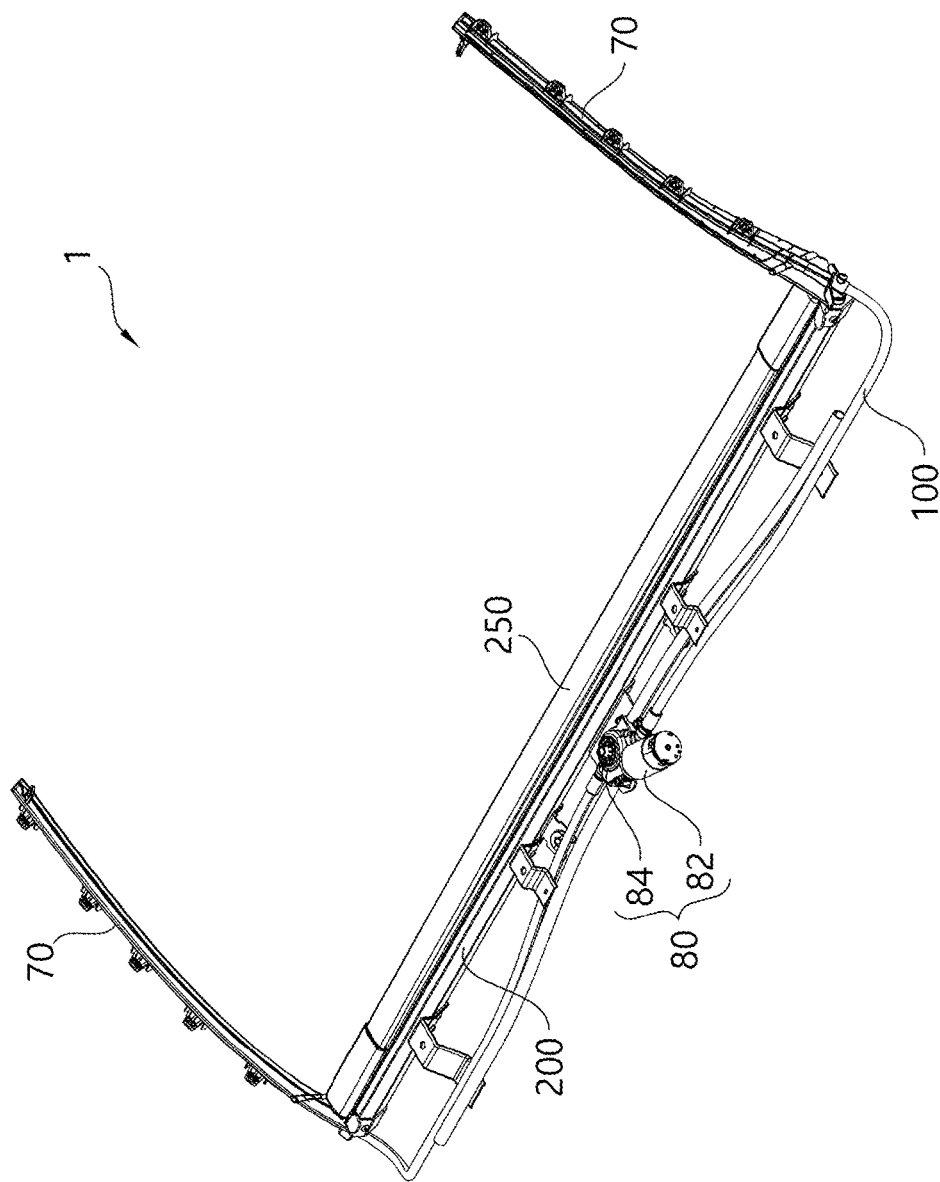
FIG. 1 is a perspective view of a window shading apparatus in a folded position according to an embodiment of the disclosure.

Below, a window shading apparatus with a function of adjusting an installation width according to an embodiment of the disclosure will be described in detail with reference to the accompanying drawings. Elements described in the following embodiments may be called other names in relevant fields. However, if the elements are similar or identical in terms of their functions, they may be regarded as equivalents even in alternative embodiments. Further, signs assigned to the elements are given for convenience of description. However, content on the drawings with these given signs do not limit the elements to a range in the drawings. Likewise, even though the elements on the drawings are partially modified according to alternative embodiments, they having functional similarity and identity may be regarded as equivalents. Further, if those skilled in the art recognizes natural involvement of elements, descriptions of the elements will be omitted. Meanwhile, the following descriptions will be made on the premise that a 'widthwise direction' refers to a direction parallel to a width when installed in a vehicle, and a direction in which a blind sheet module is extended. Further, a window shading apparatus 1 according to an embodiment of the disclosure is applied to a rear window of a vehicle (not shown), but not limited thereto and may also be applied to a sunroof of the vehicle or the like window region.

Figure 2:
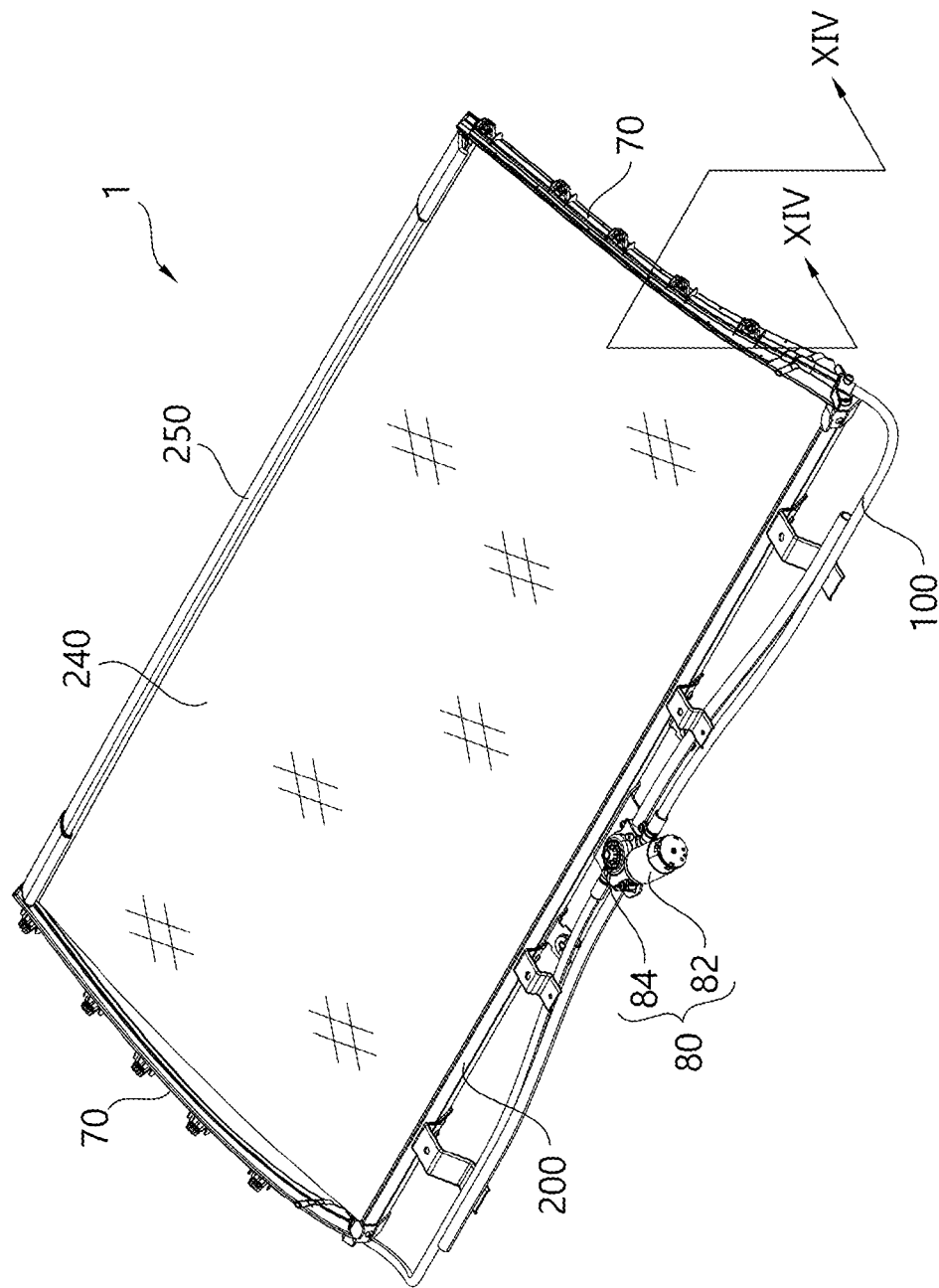
FIG. 2 is a perspective view of a window shading apparatus in an unfolded position according to an embodiment of the disclosure.
Figure 3:
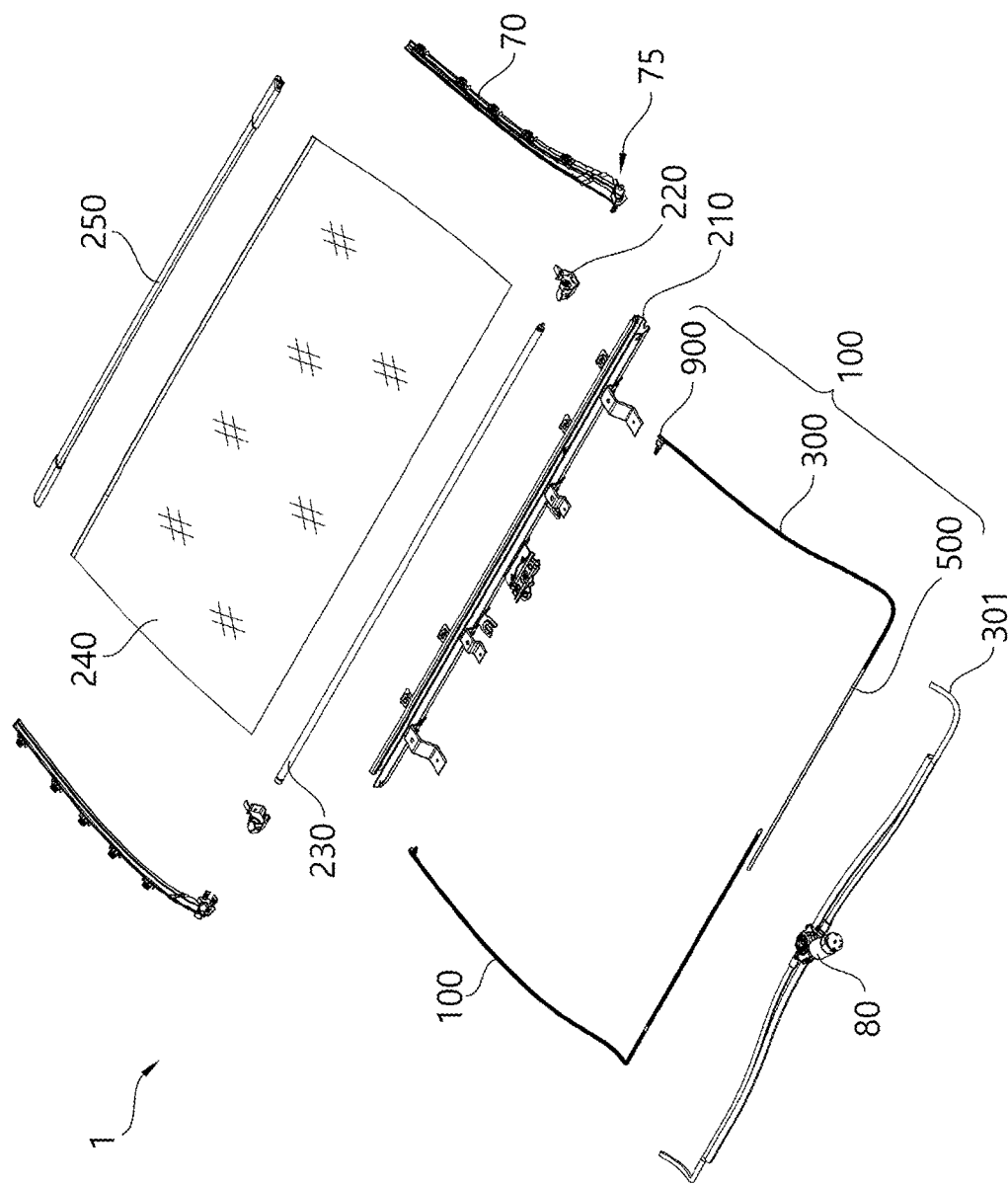
FIG. 3 is an exploded perspective view of the window shading apparatus shown in FIG. 2.

FIG. 1 is a perspective view of a window shading apparatus in a folded position according to an embodiment of the disclosure, FIG. 2 is a perspective view of a window shading apparatus in an unfolded position according to an embodiment of the disclosure, and FIG. 3 is an exploded perspective view of the window shading apparatus shown in FIG. 2.

As shown in FIGS. 1 to 3, the window shading apparatus 1 according to an embodiment of the disclosure includes a blind sheet module 200, a guide rail 70, an actuation unit 80, and a cord assembly 100. In the window shading apparatus according to the disclosure, the blind sheet module and the guide rail are fastened to one side of a vehicle, and the actuation unit actuates a blind sheet to be positioned between the unfolded position and the folded position.

The blind sheet module 200 may include a shaft 230, a blind sheet 240, a shade bar 250, a frame 210, and a frame cover 220.

The blind sheet 240 is placed at an inner side of a vehicle and structured to block light passing through a window. The blind sheet 240 may be selectively positioned between the folded position where the blind sheet 240 is rolled up into the blind sheet module 200 and a blocking position where the blind sheet 240 is unfolded to block the window. The blind sheet 240 may be made of a flexible material to be easily folded and unfolded, and may also be made of a material capable of blocking direct sunlight. For example, the blind sheet 240 may be made of fabric or non-woven fabric.

The shaft 230 is structured to roll up the blind sheet 240 thereon. The shaft 230 is extended in the widthwise direction so that the blind sheet 240 can be wholly and uniformly rolled up or unfolded. Further, the opposite sides of the shaft 230 are spaced apart in the widthwise direction and may be rotatably connected to the frame cover 220. Although it is not shown, an elastic member may be connected to the shaft 230 and give rotational force to the shaft 230. The elastic member transmits the rotational force so that the blind sheet 240 can rotate in a folding direction, thereby rolling up the blind sheet 240 with the rotational force when there is no pulling force The shade bar 250 is structured to pull the blind sheet 240. The shade bar 250 is extended in the widthwise direction and connected to one side of the blind sheet 240. The shade bar 250, of which opposite sides in the widthwise direction are connected to cord units, moves forward and backward while being kept horizontal as the cord units are moved, thereby determining folded and unfolded degrees of the blind sheet 240.

The frame 210 is structured to generally cover the blind sheet module 200. The frame 210 is extended in a lengthwise direction, and structured to accommodate the shaft 230 and at least a part of the blind sheet 240. For example, the frame 210 may be formed by bending a board in a rotational direction of the shaft 230 to have an inner space. The frame 210 may include an opened portion along the widthwise direction so that the blind sheet 240 rolled up therein can be pulled out along the shade bar 250.

The frame covers 220 are coupled to opposite ends of the frame 210 in the widthwise direction and structured to cover the blind sheet module 200 at lateral sides. The frame covers 220 form a pair, each of which includes a shaft connector 76 to be connected to the shaft 230 at an inner side thereof, and a connecting position of the frame cover 220 is fixed so that the shaft 230 can be stably held even though a position is adjusted by a position adjuster 75 (to be described later).

The guide rails 70 are extended from the opposite sides of the blind sheet module 200, and structured to guide the direction of moving the blind sheet 240. The guide rails 70 may be extended in a direction approximately perpendicular to the extending directions of the shaft 230 and the shade bar 250. Each guide rail 70 includes a guide-rail body 72, and a guide hole 74 formed inside the guide-rail body 72 and used as a passage through which the cord unit 300 of the cord assembly 100 moves. A position adjuster is provided at one side of the guide rail 70, thereby adjusting a connection distance from the foregoing blind sheet module. The guide rail 70 is configured to attach to a lateral side of a vehicle so that the window shading apparatus can be supported. The blind sheet module is installed in the widthwise direction, connected to a rear shelf of a vehicle or a panel of a vehicle, and the pair of guide rails 70 may for example be connected along a C-filler. Although the C-filler is described by way of example, the pair of guide rails 70 may be installed in a D-filler, a periphery of a sunroof, or the like various positions around a window.

The actuation unit 80 provides actuation force so that the blind sheet 240 can move between the unfolded position and the folded position. The actuation unit 80 is connected to the cord assembly 100 and applies generated actuation force to the cord assembly 100. According to an embodiment of the disclosure, the actuation unit 80 includes a motor 82 and a rotating gear 84. The motor 82 generates rotational actuation force so that the blind sheet 240 can move between the unfolded position and the folded position, and the rotating gear 84 is connected to a rotary shaft of the motor 82 and rotated by the rotational actuation force of the motor 82. Here, the rotating gear 84 meshes with a gear unit 500 (to be described later) of the cord assembly 100 and transmits the rotational actuation force to the gear unit 500.

Figure 4:
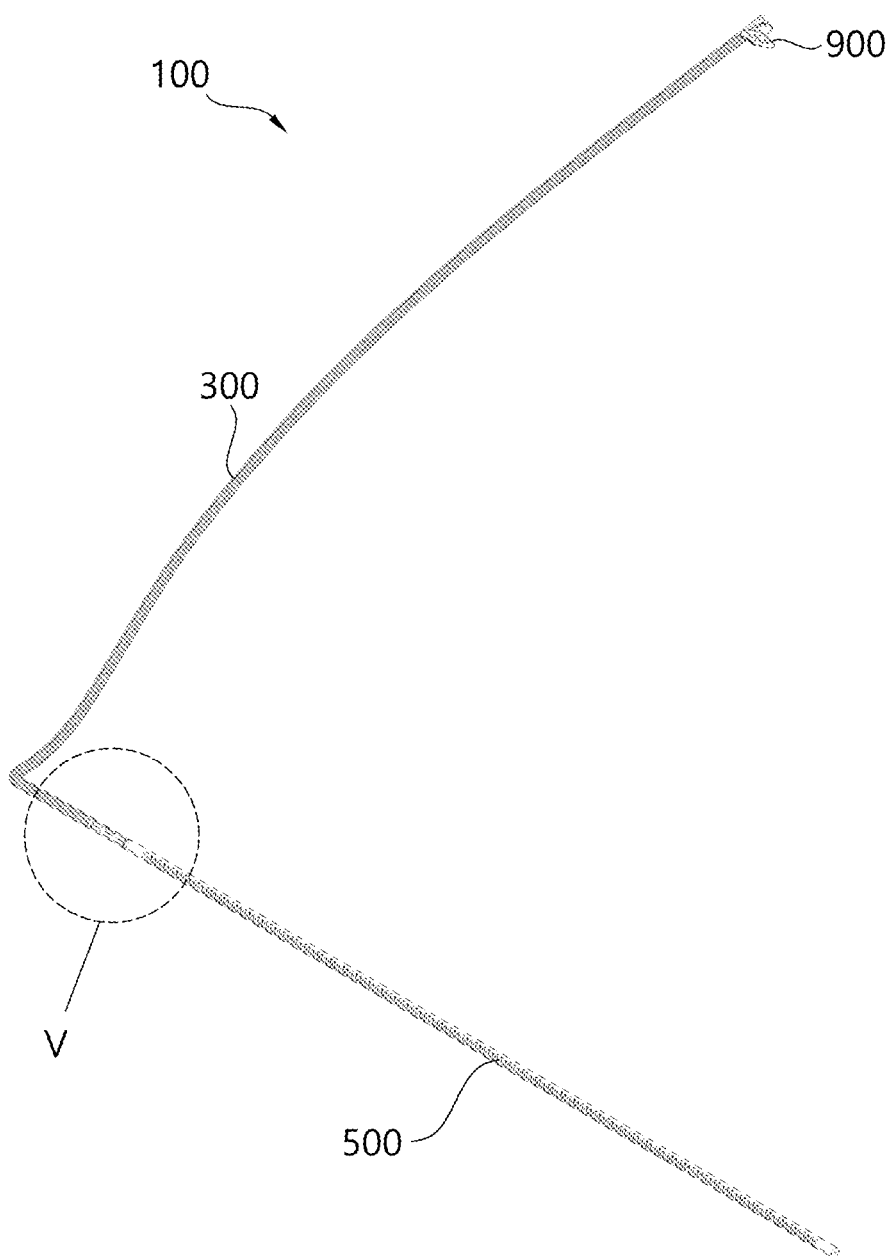
FIG. 4 is a perspective view of a cord assembly shown in FIG. 3.
Figure 5:
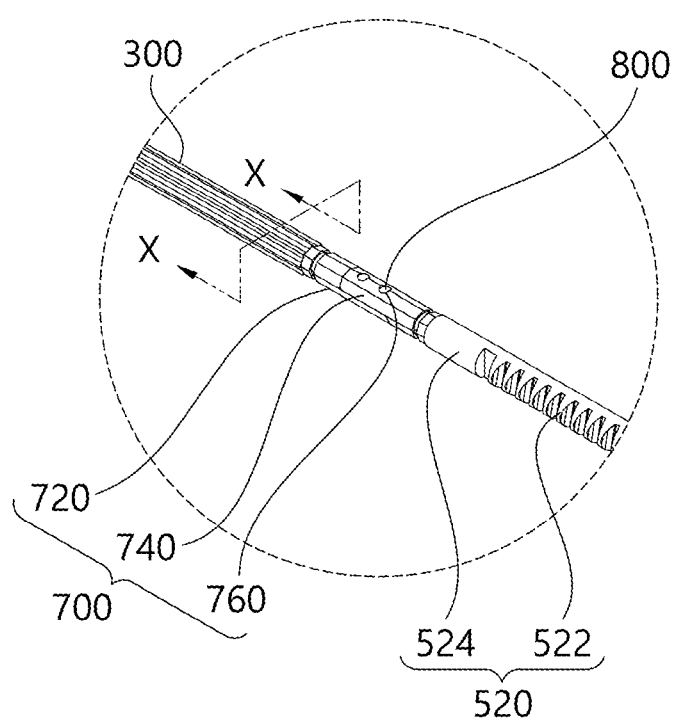
FIG. 5 is an enlarged perspective view of a region V shown in FIG. 4.
Figure 6:
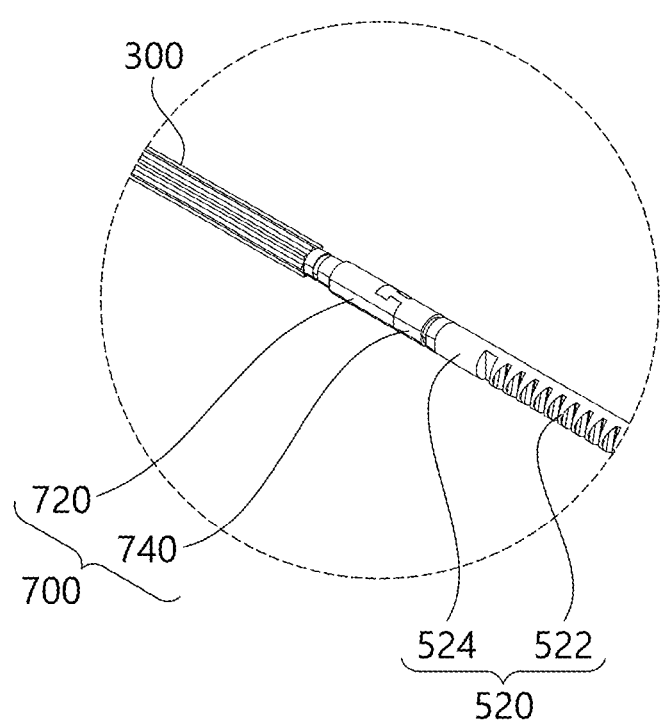
FIG. 6 is an enlarged perspective view of the region V shown in FIG. 4 according to another embodiment.
Figure 7:
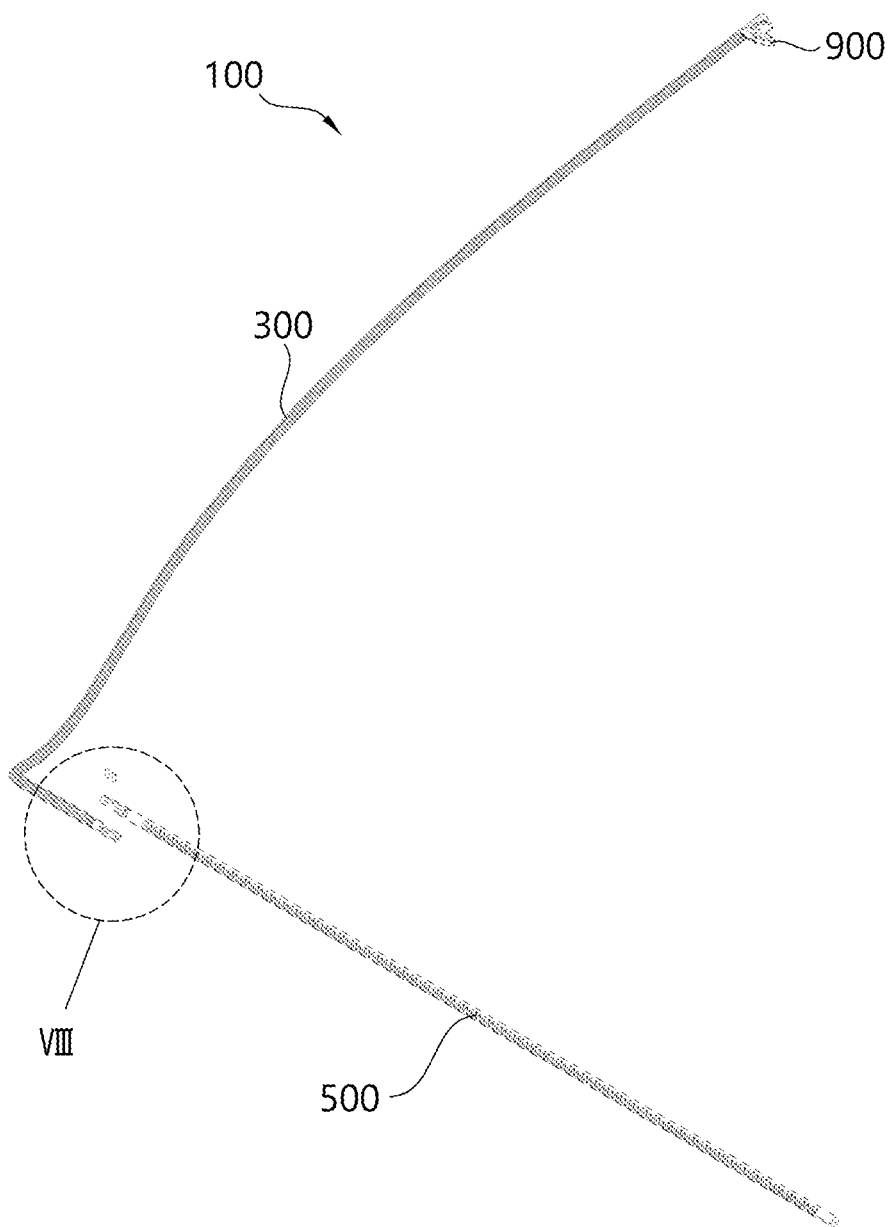
FIG. 7 is an exploded perspective view of the cord assembly shown in FIG. 4.
Figure 8:
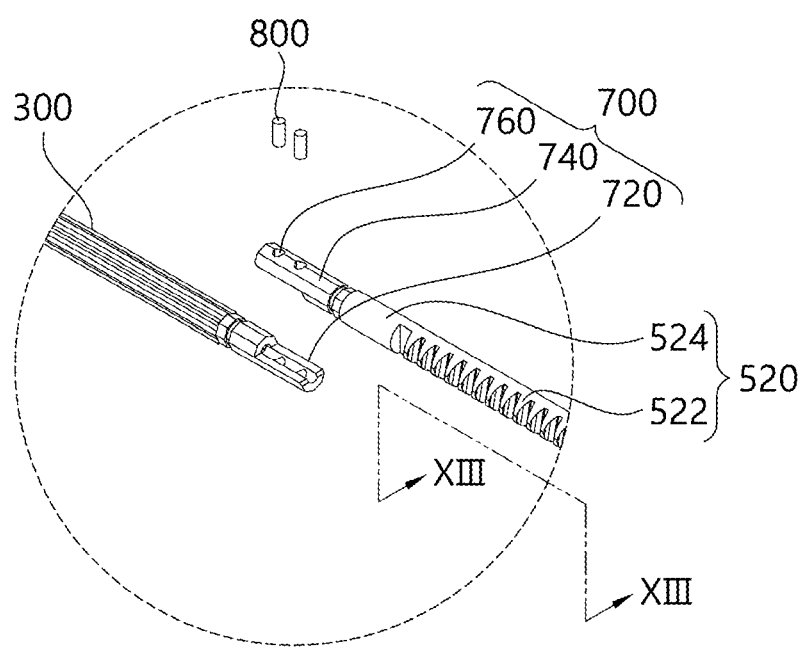
FIG. 8 is an enlarged perspective view of a region VIII shown in FIG. 7.
Figure 9:
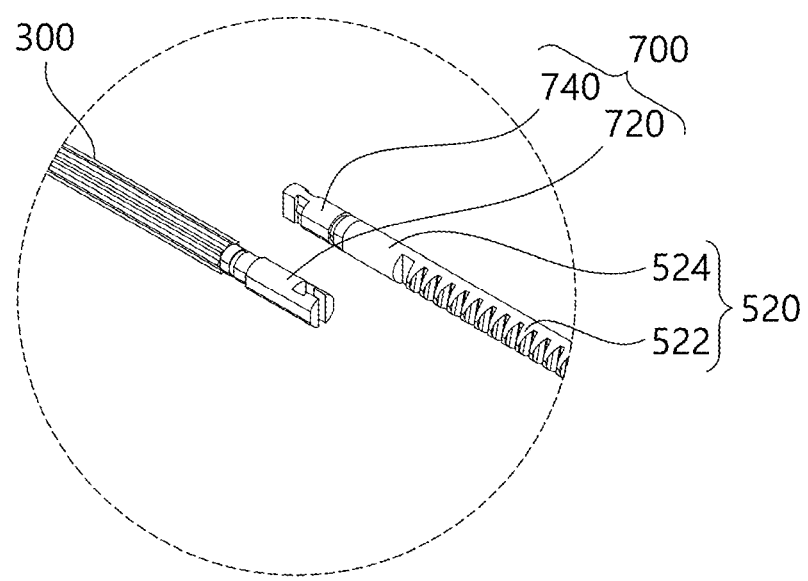
FIG. 9 is an enlarged perspective view of the region VIII shown in FIG. 8 according to another embodiment.
Figure 10:
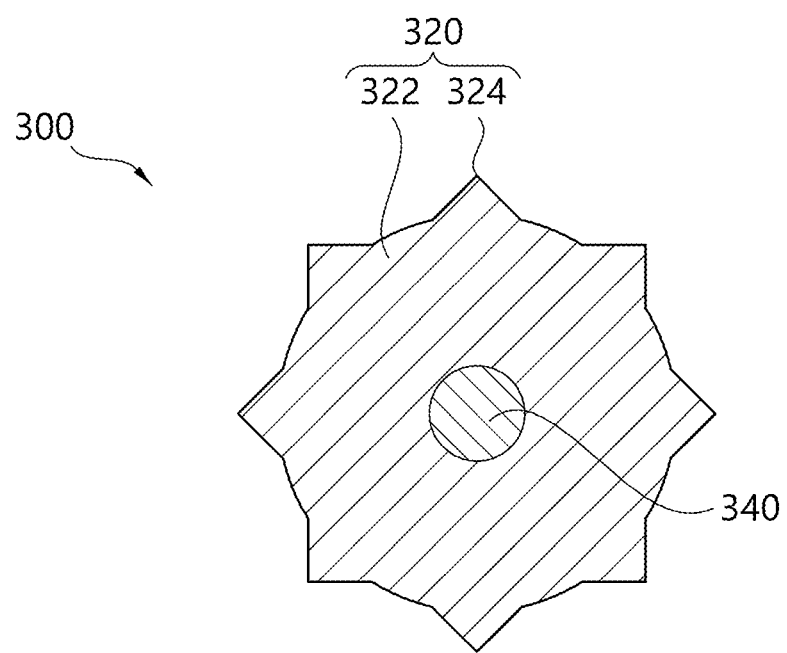
FIG. 10 is a cross-sectional view taken along line X-X shown in FIG. 5, FIGS. 11A, 11B, 12A and 12B are cross-sectional views taken along line X-X shown in FIG. 5 according to other embodiments.
Figure 13:
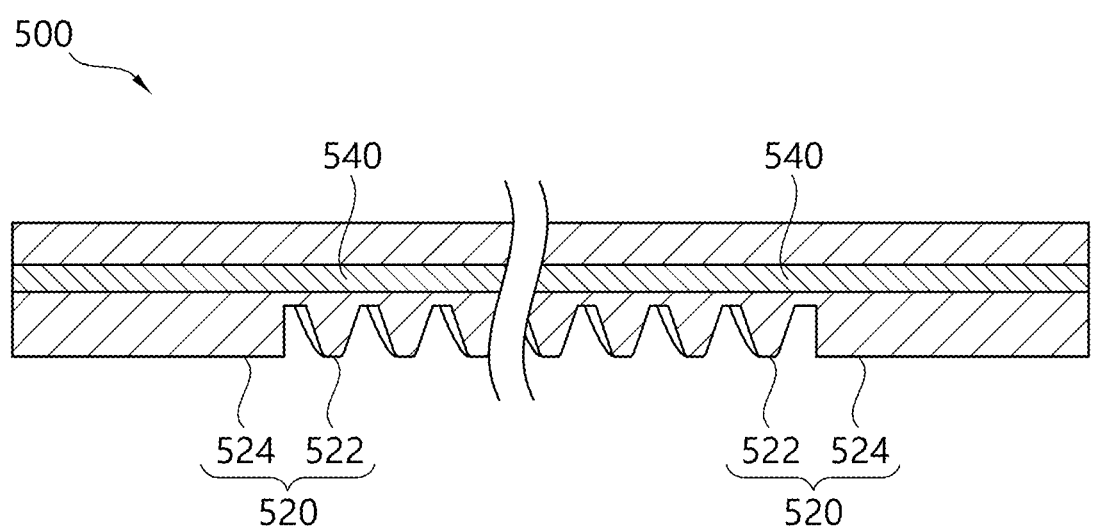
FIG. 13 is a cross-sectional view taken along line XIII-XIII shown in FIG. 8.
Figure 14:
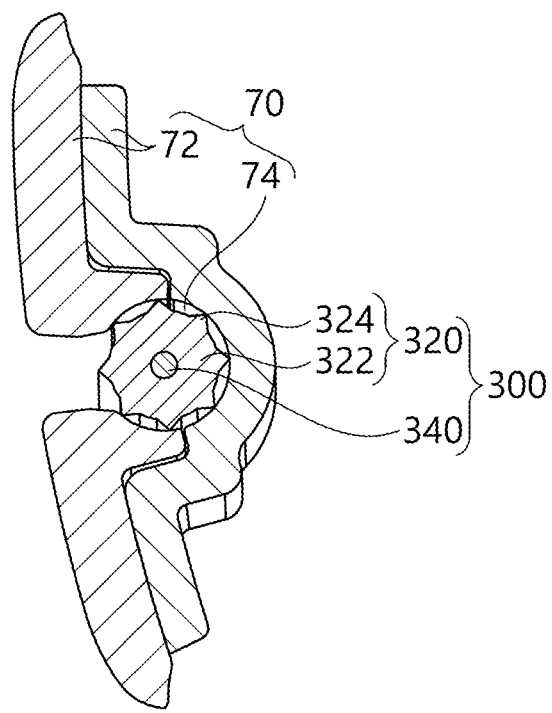
FIG. 14 is a cross-sectional perspective view taken along line XIV-XIV shown in FIG. 2.

FIG. 4 is a perspective view of a cord assembly shown in FIG. 3, FIG. 5 is an enlarged perspective view of a region V shown in FIG. 4, FIG. 6 is an enlarged perspective view of the region V shown in FIG. 4 according to another embodiment, FIG. 7 is an exploded perspective view of the cord assembly shown in FIG. 4, FIG. 8 is an enlarged perspective view of a region VIII shown in FIG. 7, FIG. 9 is an enlarged perspective view of the region VIII shown in FIG. 8 according to another embodiment, FIG. 10 is a cross-sectional view taken along line X-X shown in FIG. 5, FIGS. 11A, 116, 12A and 12B are cross-sectional views taken along line X-X shown in FIG. 5 according to other embodiments, FIG. 13 is a cross-sectional view taken along line XIII-XIII shown in FIG. 8, and FIG. 14 is a cross-sectional perspective view taken along line XIV-XIV shown in FIG. 2.

The cord assembly 100 includes the cord unit 300 and the gear unit 500 according to an embodiment of the disclosure, as shown in FIGS. 4 to 14. Further, the cord assembly 100 includes a coupling unit 700, a fastening unit 800 and a guide piece 900. The cord assemblies 100 are arranged as a pair to correspond to the pair of guide rails 70, respectively. One pair of cord assemblies 100 has linear motion in directions opposite to each other as the actuation unit 80 operates, so that the blind sheet 240 can reciprocate between the unfolded position and the folded position.

The cord unit 300 is connected to the blind sheet 240 and makes the blind sheet 240 reciprocate between the unfolded position and the folded position by the actuation force provided by the actuation unit 80. According to an embodiment of the disclosure, the cord unit 300 is substantially connected to the blind sheet 240 by means of the shade bar 250 arranged at one side of the blind sheet 240. In other words, according to an embodiment of the disclosure, the cord unit 300 is connected by the blind sheet 240 and the shade bar 250. The cord unit 300 has a cross section to be in partial contact with the inner side of the guide rail 70 in a plurality of regions along the inner side of the guide rail 70, and linearly reciprocates in the lengthwise direction of the guide rail 70 by the actuation force provided from the actuation unit 80.

According to an embodiment of the disclosure, the cross section of the cord unit 300 has a stellar shape as shown in FIG. 10, to be in point contact with the guide rail 70 at a plurality of points leaving certain distances therebetween along a circumferential direction. Further, the cord unit 300 moves being in line contact with the guide rail 70 in a plurality of lines when the blind sheet 240 moves between the unfolded position for covering the window and the folded position for uncovering the window.

The cord unit 300 according to the disclosure includes a cord member 320 and a wire member 340. The cord member 320 moves along the guide rail 70 by the actuation force provided by the actuation unit 80 while being in contact with the guide rail 70. The cord member 320 includes a core portion 322, and at least one contact portion 324 protruding from an outer surface of the core portion 322 and being in contact with an inner surface of the guide rail 70. Further, a plurality of contact portions 324 of the cord member 320 protrudes from the outer surface of the core portion 322 while leaving a distance from each other, and is in contact with the inner surface of the guide rail 70. Specifically, according to an embodiment of the disclosure, the cord member 320 has the stellar shape as shown in FIG. 10, so that the cross sections of the core portion 322 and the contact portion 324 can be in point contact with the inner surface of the guide rail 70 at a plurality of points.

Figure 11A:
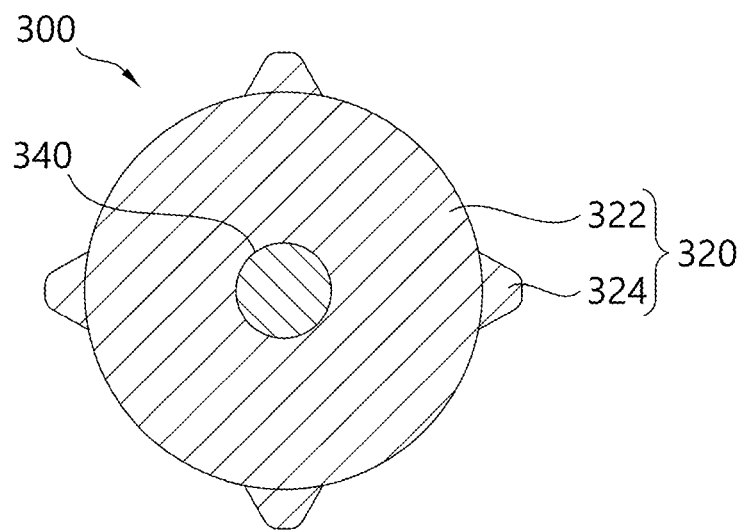
Figure 11B:
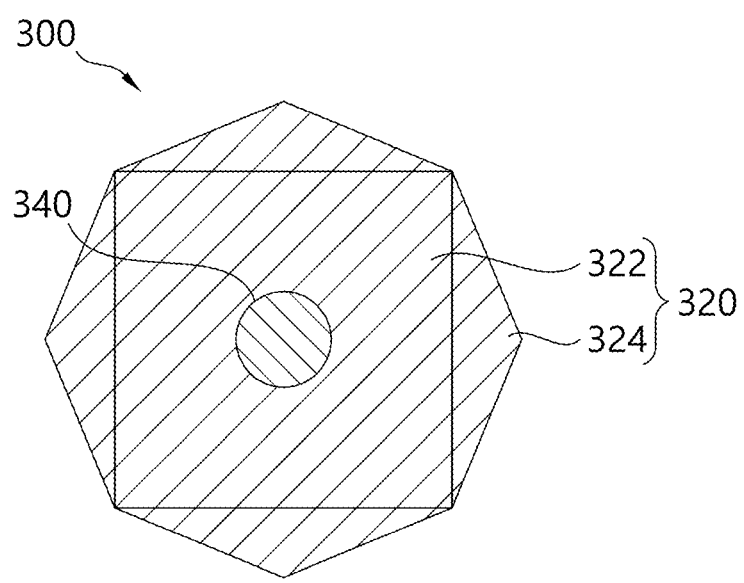
Figure 12A:
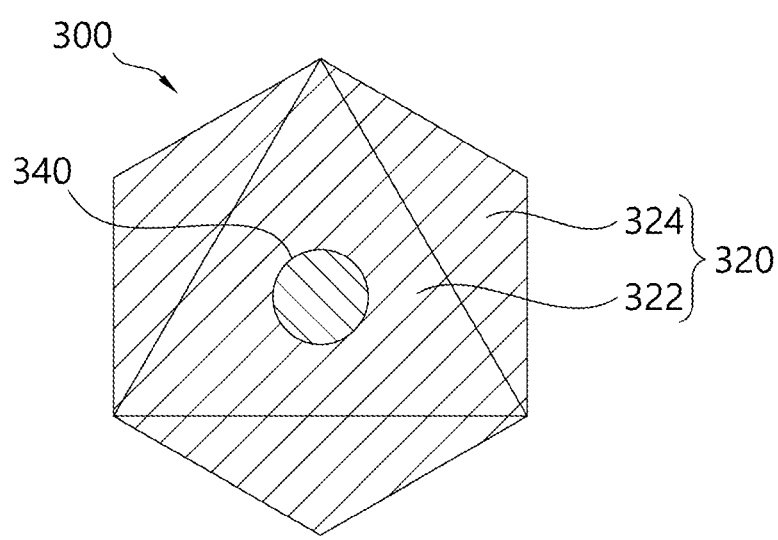
Figure 12B:
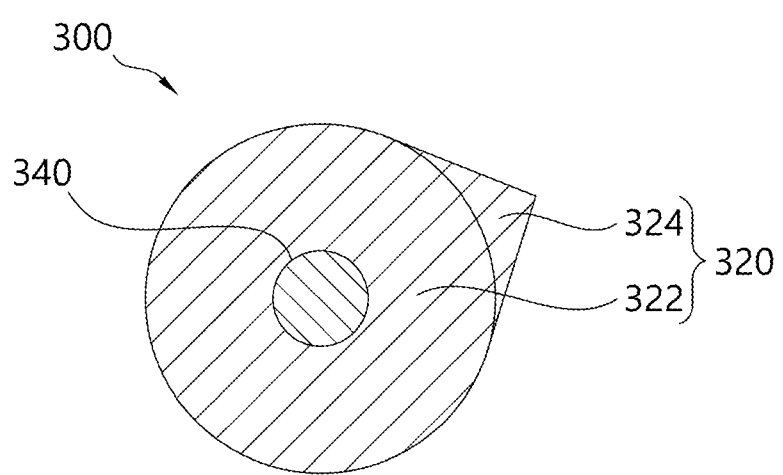

Meanwhile, as shown in FIGS. 11A, 11B, 12A and 12B, the core portion 322 and the contact portion 324 of the cord member 320 according to other embodiments may be different from the cord member 320 having the stellar shape as shown in FIG. 10. The cord member 320 shown in FIG. 11A is similar to the cord member 320 shown in FIG. 10, but includes a contact portion 324 of which a contact surface to be in contact with the guide rail 70 is larger than that of the contact portion 324 of FIG. 10. The cord member 320 shown in FIG. 11B includes a core portion 322 having a quadrangular cross-section, and contact portions 324 protruding from four sides of the core portion 322. The cord member 320 shown in FIG. 12A includes a core portion 322 having a triangular cross-section, and contact portions 324 protruding from three sides of the core portion 322. The cord member 320 shown in FIG. 12B includes a core portion 322 having a circular cross-section, and a single contact portion 324 protruding from the circumference of the core portion 322.

Here, unlike the cross-section of the cord member 320 shown in FIGS. 10 to 12B, the core portion 322 and the contact portion 324 of the cord member 320 can contact with the guide rail 70 in a plurality of regions when the blind sheet 240 moves between the unfolded position for covering the window and the folded position for uncovering the window. According to an embodiment of the disclosure, the cross section of the cord member 320 shown in FIG. 10 has the stellar shape to be in point contact with the inner surface of the guide rail 70 at a plurality of points, and moves as being in line contact with the inner surface of the guide rail 70 in a plurality of lines when moved by the actuation force of the actuation unit 80.

In this way, the outer surface of the cord member 320 of the cord unit 300 is in contact with the inner surface of the guide rail 70 in a plurality of regions in a linear moving direction of the cord unit 300, thereby having effects on improving the movability of the cord unit 300 inside the guide rail 70 and reducing friction noise. Further, lubricating oil for lubrication between the cord unit 300 and the guide rail 70 may be provided in a recessed region between the plurality of contact portions 324, thereby further reducing the friction nose between the cord unit 300 and the guide rail 70 while preventing the oil from being leaked to the outside.

The wire member 340 is arranged inside the cord member 320. The wire member 340 reinforces structural stiffness of the cord member 320 while the cord member 320 is reciprocating. The cord unit 300 is formed by insert injection molding of the cord member 320 and the wire member 340. Specifically, the cord member 320 is formed by injection molding of synthetic resin, and the wire member 340 is made of one of metal and nonferrous metal to restrict change in length due to thermal deformation of the cord member 320. Substantially, the cord member 320 is made of synthetic resin and is thus flexible but has shortcomings of weak stiffness and length changeable according to external thermal conditions. To solve such shortcomings of the cord member 320 having weak stiffness and length changeable according to external thermal conditions, the wire member 340 is placed inside the cord member 320. In particular, the wire member 340 restricts the changeable length of the cord member 320 according to the thermal conditions, thereby securing operation reliability of the window shading apparatus 1.

Next, the gear unit 500 is connected to one side of the cord unit 300. The gear unit 500 converts rotational motion of the rotating gear 84 into linear motion of the cord unit 300 while interlocking with the rotational motion of the rotating gear 84. The gear unit 500 according to the disclosure includes a gear member 520 and a gear wire member 540.

The gear member 520 meshes with the rotating gear 84 and converts the rotational motion of the rotating gear 84 into the linear motion. The gear member 520 includes a gear 522 and a stopper 524. The gear 522 is formed with a rack to mesh with the rotating gear 84 and corresponds to a moving distance of the cord unit 300 moving the blind sheet 240 between the unfolded position and the folded position. In other words, the gear 522 substantially corresponds to a moving distance of the blind sheet 240 and is formed with a gear having a rack shape so that the cord unit 300 can have the linear motion. The stoppers 524 are arranged with the rack therebetween to have an outer surface not to mesh with the rotating gear 8, i.e., the outer surface without gears which mesh with the rotating gear 84. The stopper 524 restricts the movement of the cord unit 300 between the unfolded position and the folded position of the blind sheet 240. Specifically, the stopper 524 restricts the movement of the cord unit 300 so that the cord unit 300 cannot move any more in the unfolded position of the blind sheet 10 and/or in the folded position of the blind sheet 240. More detailed descriptions about the stopper 524 will be made below with description about operations of the window shading apparatus 1.

The gear wire member 540 is provided inside the gear member 520 as shown in FIG. 9. The gear wire member 540 reinforces the structural stiffness of the gear member 520 when the gear member 520 linearly moves meshing with the rotating gear 84. The gear unit 500 is formed based on insert injection molding the gear member 520 and the gear wire member 540. Specifically, the gear member 520 is formed by injection molding of synthetic resin, and the gear wire member 540 is made of one of metal and nonferrous metal to restrict change in length due to thermal deformation of the gear member 520. Substantially, the gear member 520 is made of synthetic resin and is thus flexible but has shortcomings of weak stiffness and length changeable according to external thermal conditions. To solve such shortcomings of the gear member 520 having weak stiffness and length changeable according to external thermal conditions, the gear wire member 540 is placed inside the gear member 520.

In more detail, the gear wire member 540 restricts the changeable length of the gear member 520 according to the thermal conditions, thereby maintaining gear meshing between the rotating gear 84 and the gear member 520 and securing operation reliability of the window shading apparatus 1.

The coupling unit 700, as shown in FIGS. 5 and 7, includes a first coupling portion 720 connected to the cord unit 300, a second coupling portion 740 connected to the gear unit 500, and a coupling hole 760 formed penetrating the first coupling portion 720 and the second coupling portion 740. Here, the first coupling portion 720 and the second coupling portion 740 have the same shape, and are respectively connected to the cord unit 300 and the gear unit 500 for more detailed description. Bu surface contact coupling between the first coupling portion 720 and the second coupling portion 740, it is possible to restrict the change in length between the cord unit 300 and the gear unit 500.

The fastening unit 800 is inserted in a direction transverse to the lengthwise direction of the coupling unit 700, thereby fastening the coupling unit 700. Specifically, the fastening unit 800 employs at least one of a pin and a screw to be inserted in the coupling holes 760 respectively formed in the first coupling portion 720 and the second coupling portion 740, thereby fastening the first coupling portion 720 and the second coupling portion 740 each other by at least one of a pin fastening method and a screw fastening method.

Meanwhile, the coupling unit 700, as shown in FIGS. 6 and 9, includes the first coupling portion 720 connected to the cord unit 300, and the second coupling portion 740 connected to the gear unit 500. Unlike the coupling unit 700 shown in FIGS. 5 and 7, the coupling unit 700 shown in FIGS. 6 and 9 is coupled without the fastening unit 800. Specifically, the first coupling portion 720 and the second coupling portion 740 are fitted to each other. In other words, as shown in the accompanying drawings, the first coupling portion 720 and the second coupling portion 740 are sliding-fitted to each other in up and down directions. Here, when the first coupling portion 720 and the second coupling portion 740 are fitted to each other, the first coupling portion 720 and the second coupling portion 740 may be pressed to prevent separation and reinforce coupling force, and thus firmly coupled and connected. The guide piece 900 is placed between the shade bar 250 and the cord unit 300. The guide piece 900 transmits the linear motion of the cord unit 300 to the shade bar 250. In other words, the guide piece 900 connects the shade bar 250 and the cord unit 300 with each other and transmits actuation force so that the blind sheet 240 can move between the unfolded position and the folded position. According to an embodiment of the disclosure, the guide piece 900 and the cord unit 300 are injection molded as a single body, but not limited thereto and may be separately manufactured and then couple the shade bar 250 and the cord unit 300 with each other.

Figure 15:
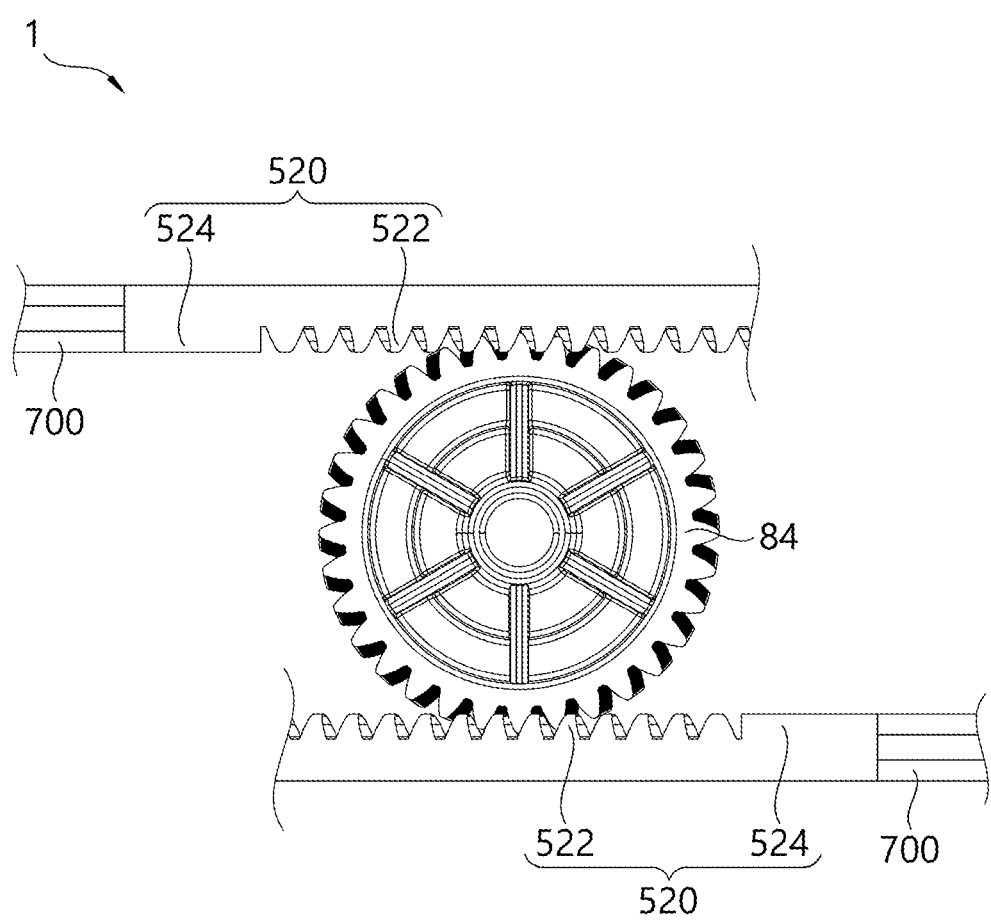
FIG. 15 is a perspective view showing operations of the actuation unit and the cord assembly at the folded position shown in FIG. 1.
Figure 16:
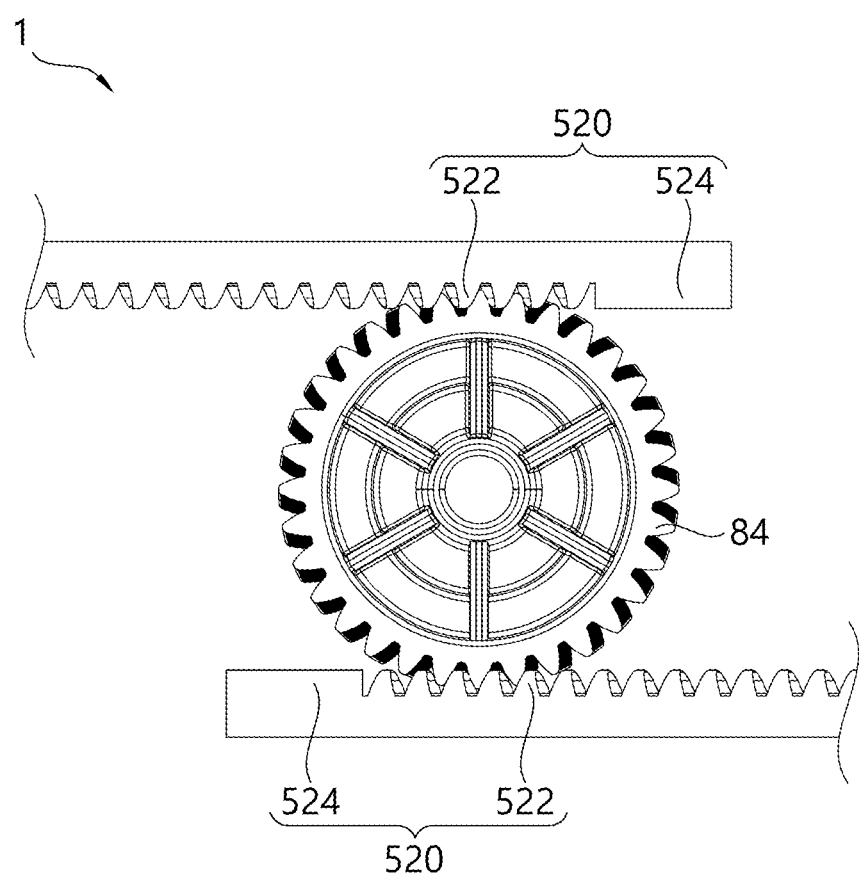
FIG. 16 is a perspective view showing operations of the actuation unit and the cord assembly at the unfolded position shown in FIG. 2.

FIG. 15 is a perspective view showing operations of the actuation unit and the cord assembly at the folded position shown in FIG. 1, and FIG. 16 is a perspective view showing operations of the actuation unit and the cord assembly at the unfolded position shown in FIG. 2.

With this structure, the window shading apparatus 1 according to an embodiment of the disclosure operates as follows.

FIGS. 1 and 15 illustrate the operations of the window shading apparatus 1 in which the blind sheet 240 is positioned at the folded position. When the blind sheet 240 is in the folded position not to cover the window, the blind sheet 240 is substantially positioned on the rear shelf of the vehicle. In this case, the movement of the cord assembly 100 is restricted by the stopper 524 of the gear unit 500 even though the rotating gear 84 is rotating.

FIGS. 2 and 16 illustrate the operations of the window shading apparatus 1 in which the blind sheet 240 is moved from the folded position to the unfolded position to cover the window.

When the blind sheet 240 is moved from the folded position shown in FIGS. 1 and 15 to the unfolded position shown in FIGS. 2 and 16, the rotating gear 84 is rotating and the gear units 500 of the pair of cord assemblies 100 meshing with the rotating gear 84 linearly move in the opposite directions. In this case, the cord unit 300 has a stellar cross-section as shown in FIG. 10 having the plurality of point contact portions to be in point contact with the inside of the guide rail 70, and to be substantially in line contact with the inside of the guide rail 70 in the plurality of lines during the linear motion inside the guide rail 70. Such contact with the guide rail 70 based on the shape of the cord unit 300, i.e., the plurality of contact lines during the linear motion improves mobility of the cord unit 300 and reduces friction noise between the guide rail 70 and the cord unit 300.

As shown in FIG. 16, when the blind sheet 240 is positioned at the unfolded position, the rotating gear 84 and the gear unit 500 does not mesh with each other by the stopper 524 even though the rotating gear 84 is rotating, thereby restricting the movement of the cord unit 300.

Thus, the cord unit is movable as the guide rail and the cord unit having the stellar shape to be in point contact with the guide rail at a plurality of points are in line contact with each other in a plurality of lines, and therefore the mobility of the cord unit is improved and the friction noise between the guide rail and the cord unit is reduced, thereby enhancing quality of a product.

Further, the gear unit for the linear motion of the cord unit includes the stopper for restricting the movement of the cord unit regardless of the actuation of the actuation unit, thereby improving the operation reliability of the product.

Below, the structure of the window shading apparatus having a function for adjusting the installation width according to the disclosure will be described in detail with reference to FIGS. 17 to 22.

Figure 17:
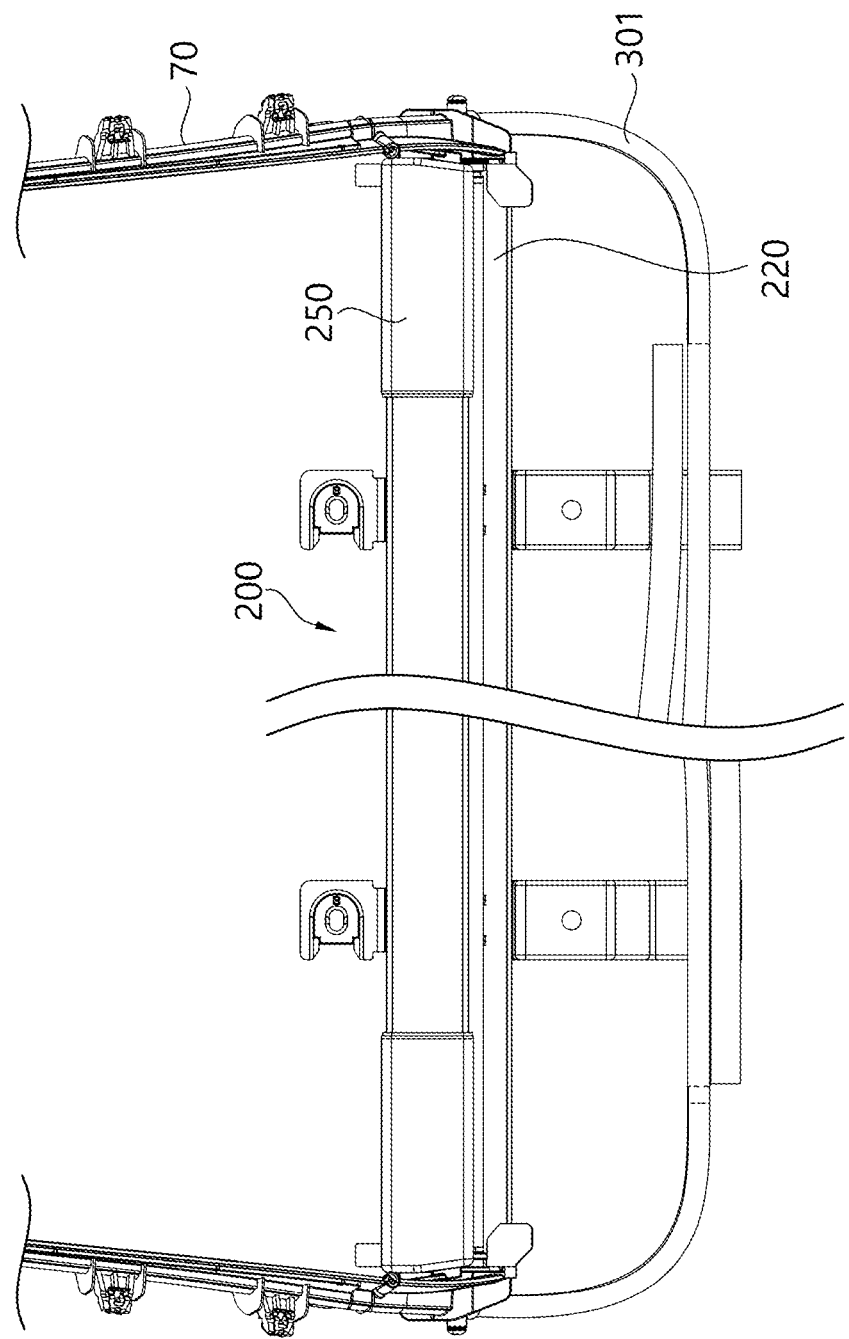
FIG. 17 is a partial enlarged view showing that the blind sheet module 200 and the position adjuster 75 according to the disclosure are coupled.

FIG. 17 is a partial enlarged view showing that the blind sheet module 200 and the position adjuster 75 according to the disclosure are coupled.

As shown therein, the opposite sides of the blind sheet module 200 in the widthwise direction are provided with the pair of guide rails 70, respectively. Each guide rail 70 includes the position adjuster 75 to adjust a position to which the blind sheet module 200 is connected. For example, when the window shading apparatus 1 according to this embodiment is installed in a vehicle, the length in the widthwise direction may be adjusted so that the guide rail 70 can be precisely installed along the opposite C-fillers of the vehicle.

Figure 18:
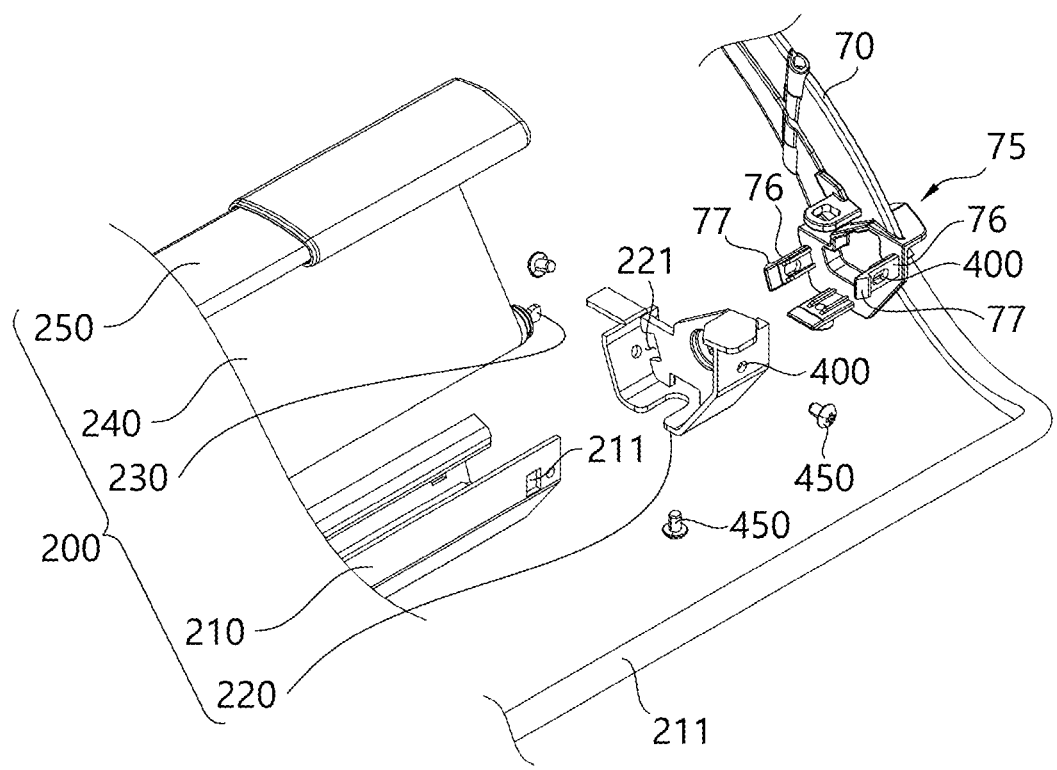
FIG. 18 is an exploded and enlarged perspective view of a connector between the blind sheet module 200 and the guide rail 70.
Figure 19:
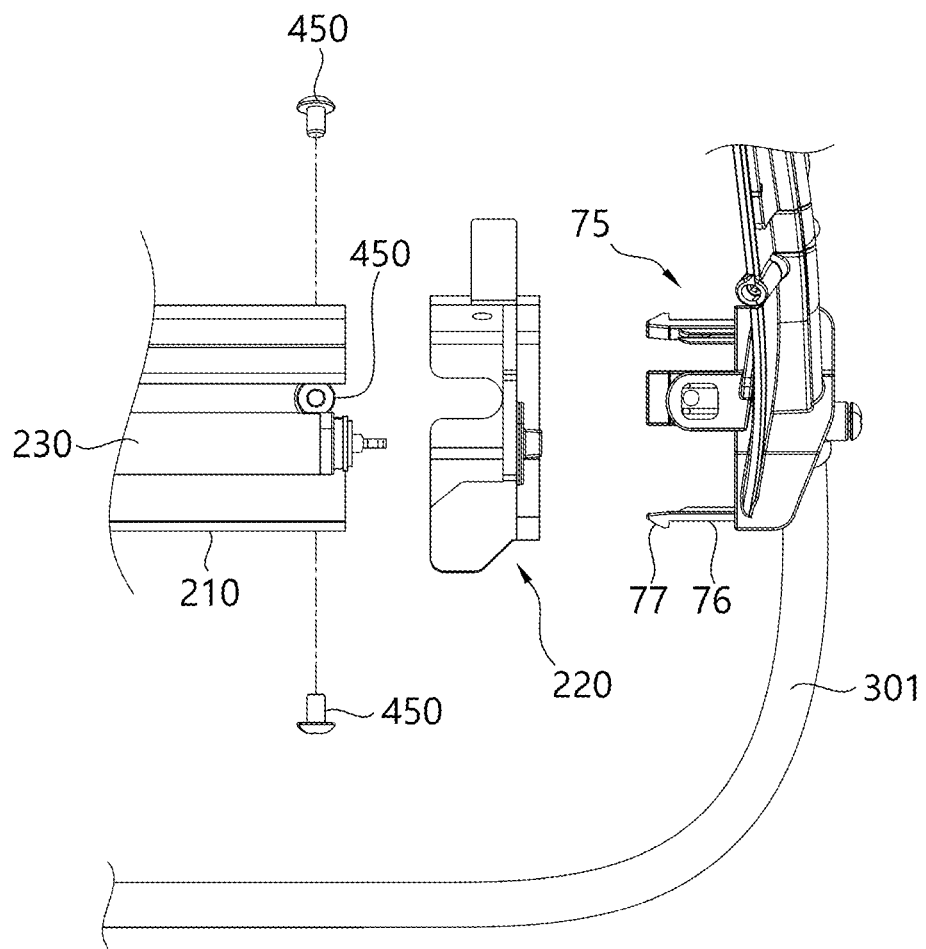
FIG. 19 is an exploded and enlarged plan view of the connector between the blind sheet module 200 and the guide rail 70.

FIG. 18 is an exploded and enlarged perspective view of a connector between the blind sheet module 200 and the guide rail 70, and FIG. 19 is an exploded and enlarged plan view of the connector between the blind sheet module 200 and the guide rail 70.

As shown therein, the position adjuster 75 may include the connector 76 extended and formed toward the blind sheet module 200. The frame 210 may include a projection accommodating groove 211 to accommodate a projection 77 of the position adjuster 75 (to be described later). Further, the frame cover 220 may include a connector insertion hole 211 formed corresponding to the connector 76 so that the connector 76 (to be described later) can pass through the frame cover 220 and reach the frame 210. Eventually, widthwise adjustment between the blind sheet module 200 and the guide rail 70 is achieved by the position adjuster 75, and thus the guide rail 70 is firmly fastened to the blind sheet module 200. In this regard, detailed descriptions will be made later.

Referring back to FIGS. 18 and 19, the position adjuster 75 is provided at one side of each guide rail 70, and thus the guide rail 70 is fastened after the position for connection with the blind sheet module 200 is adjusted in the widthwise direction.

Each individual position adjuster 75 may include at least one connector 76. The connector 76 is extended toward the blind sheet module 200 by a predetermined length, and fastened after a relative position to the blind sheet module 200 in the widthwise direction is adjusted within a predetermined length. At least one connector 76 may be inserted into the frame 210 after penetrating the frame cover 220 in the widthwise direction, for the purpose of connection with the frame 210. The connector 76 may be provided at a plurality of points corresponding to a curved shape of the frame 210 so as to be in close contact with the inner surface of the frame 210.

The connector 76 and the frame 210 may be connected by a fitting structure. For example, the connector 76 may include the projection 77 protruding outward, and the frame 210 may include the projection accommodating groove 211 corresponding to the projection 77 and accommodating the projection 77. Therefore, when the position adjuster 75 is fitted to the frame cover 220, the projection 77 may be fitted into the projection accommodating groove 211. The projection accommodating groove 211 may be formed to have a predetermined length so that the position adjustment of the position adjuster 75 can be performed in the widthwise direction in the state that the projection 77 is fitted to projection accommodating groove 211. The projection 77 may be provided in at least one among one or more connectors 76. For example, as shown in FIG. 19, there may be three connectors 76, each of which includes the projection 77 protruding outward, and the frame 210 may be formed with the projection accommodating grooves 211 corresponding to the positions of three projections 77.

Fastening holes 400 are provided to insert a fastener 450 therein in the state that the frame 210, the frame cover 220 and the position adjuster 75 are coupled. The frame 210 and the frame cover 220 are formed with circular fastening holes 400 so as to hole the connecting position. On the other hand, the fastening hole 400 of the connector 76 is formed as an elongated hole formed and extended in the widthwise direction so that the position can be adjusted in the widthwise direction with the fastener 450 inserted therein. Therefore, the frame cover 220 is fastened to the frame 210 and stably supports and holds the shaft 230, and the position adjuster 75 adjusts the position in the widthwise direction independently of the frame cover 220.

Below, it will be described in detail with reference to FIGS. 20A to 22B that the position is changed during the position adjustment.

Figure 20A:
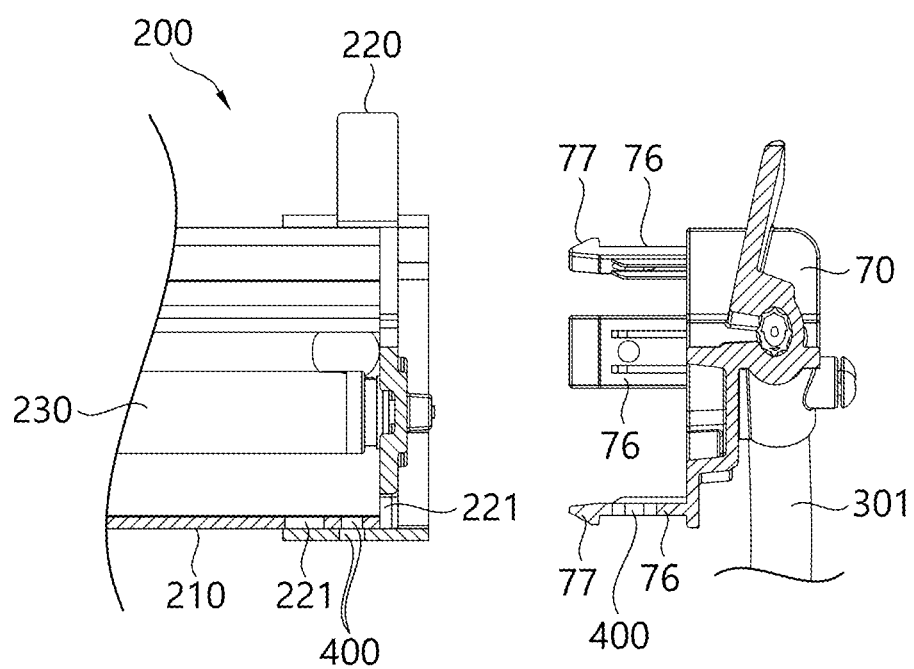
FIGS. 20A and 20B are partial cross-sectional views showing concept before and after connection of the position adjuster 75.
Figure 20B:
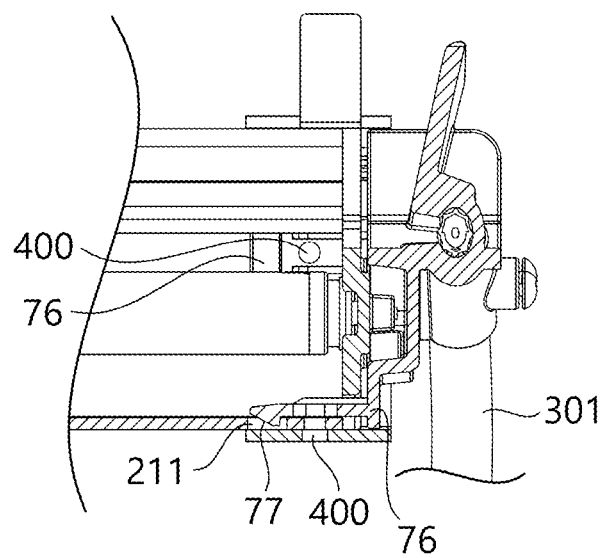

FIGS. 20A and 20B are partial cross-sectional views showing concept before and after connection of the position adjuster 75. For convenience of description, the frame 210, the frame cover 220 and the position adjuster 75 are illustrated as partially cut open. As shown in FIG. 20A, the frame 210, the frame cover 220 and the shaft 230 are first connected in the blind sheet module 200. Then, as shown in FIG. 20B, the position adjuster 75 is inserted into the frame 210 while passing through the frame cover 220 in the widthwise direction. In this state, the projection 77 of the connector 76 is positioned in the projection accommodating groove 211 of the frame 210, and therefore the position adjuster 75 is in a provisional connection state where outward separation is prevented.

Figure 21A:
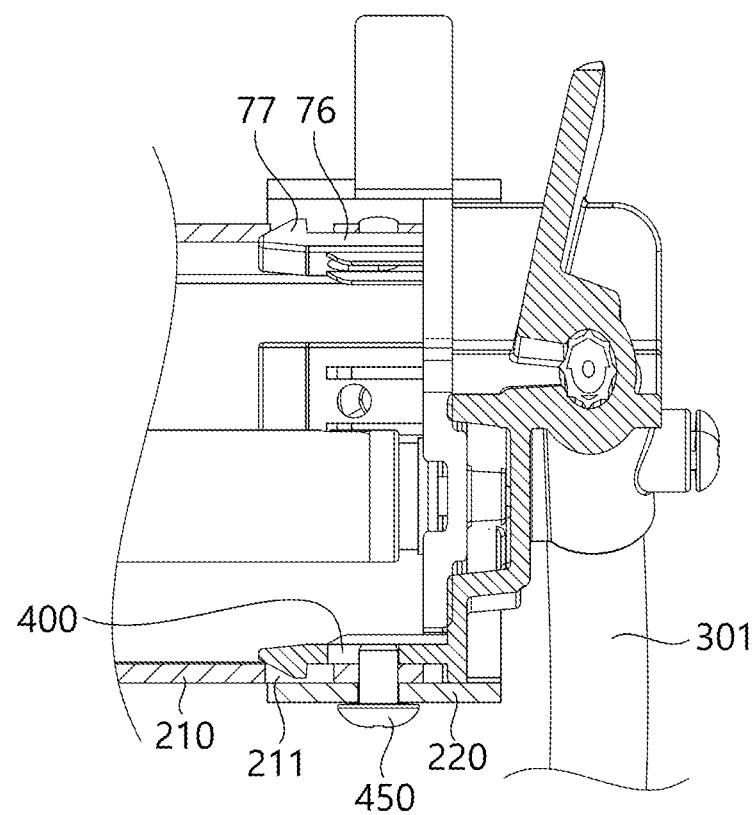
FIGS. 21A and 21B are partial cross-sectional views showing concept of adjusting the connection position of the position adjuster.
Figure 21B:
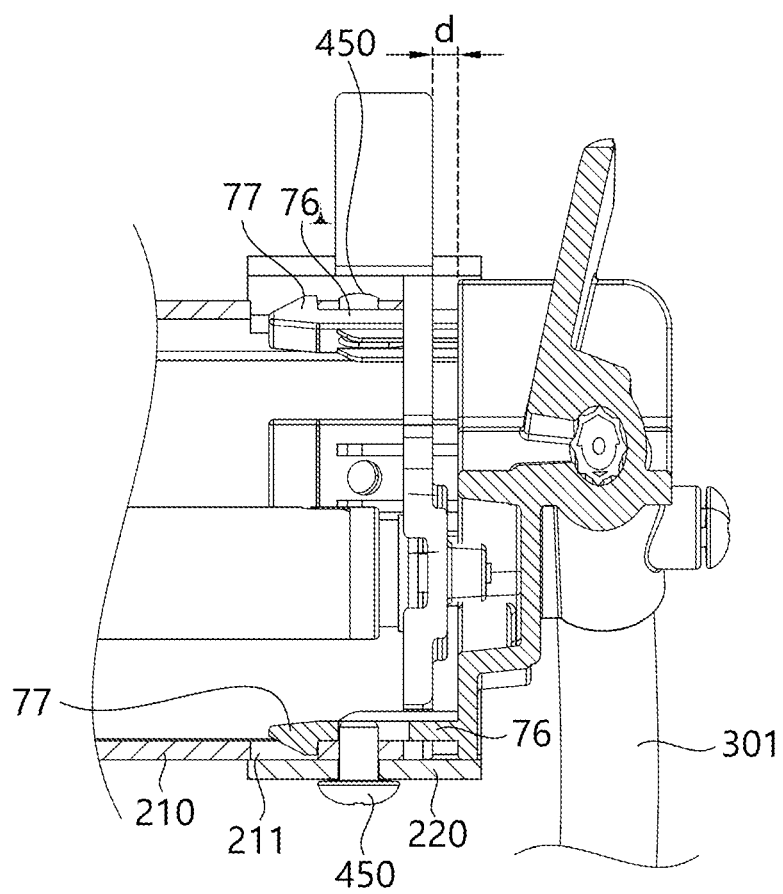

FIGS. 21A and 21B are partial cross-sectional views showing concept of adjusting the connection position of the position adjuster 75.

In the window shading apparatus according to the disclosure, the connection position is precisely adjusted after the position adjuster 75 is fitted to the blind sheet module 200 as described above with reference to FIGS. 20A and 20B. Specifically, the gamut of length in the widthwise direction is adjusted corresponding to an error in interior spaces of vehicles for installation, and then the length in the widthwise direction is adjusted. As an example of the adjusted connection position, there may be a certain position between the farthest position of the position adjuster 75 from the blind sheet module 200 as shown in FIG. 21A and the closest position as shown in FIG. 21B. In this case, a position adjustable distance d may be given as shown in FIG. 21A, and the maximum adjustable length 2*d* may also be given because the width is adjustable at both sides of the blind sheet 240. Meanwhile, the length of the blind sheet module 200 in the widthwise direction and the position adjustable distance of the position adjuster 75 may be determined based on error data of average interior spaces of vehicles, for example, within a few millimeters.

Figure 22A:
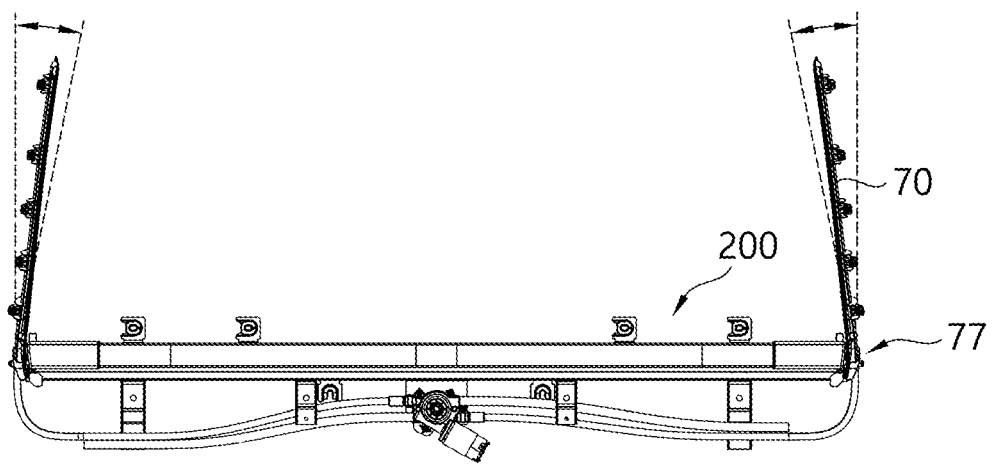
FIGS. 22A and 22B are conceptual views showing partial change in an outer appearance of the window shading apparatus when the position is adjusted.
Figure 22B:
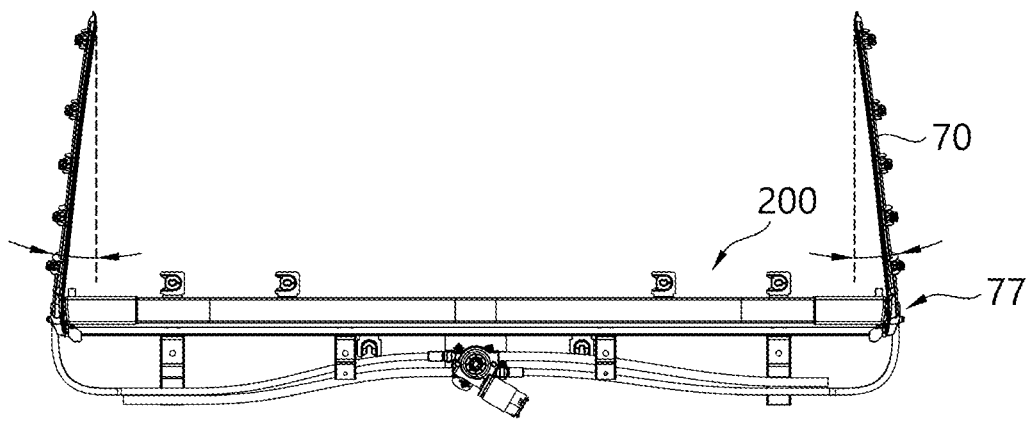

FIGS. 22A and 22B are conceptual views showing partial change in an outer appearance of the window shading apparatus when the position is adjusted.

As shown therein, when an error occurs in an upper side of an installation space, the guide rail 70 may be transformed a little suitably for the installation position. Further, when an error occurs in a lower side of the installation space and the position adjustment is needed, the connection position of the position adjuster 75 may be adjusted to adjust the whole widthwise length.

Meanwhile, although it is not shown, the foregoing methods of adjusting the installation positions in the upper and lower sides may be combined for the purpose of precise installation corresponding to the error.

As described above, the window shading apparatus 1 with the adjustable installation width according to the disclosure improves completeness because the width is adjustable corresponding to the installation space, in particular, the installation width.

The invention claimed is:

1. A window shading apparatus comprising:
   a blind sheet module comprising a blind sheet configured to be unfolded to cover a window of a vehicle as the blind sheet is pulled outward from a folded state;
   a pair of cord units configured to receive an actuation force to pull and unfold the blind sheet; and
   a pair of guide rails respectively connected to opposite sides of the blind sheet module to respectively guide the pair of cord units to move, each of the guide rails comprising a position adjuster configured to adjust a connection position to which the blind sheet module is connected,
   wherein the blind sheet module comprises:
   a shaft extending in a widthwise direction to roll up the blind sheet thereon;
   a frame extending in the widthwise direction to accommodate the shaft and at least a part of the rolled-up blind sheet; and
   a pair of frame covers connected and fastened to opposite sides of the frame in the widthwise direction,
   wherein each position adjuster comprises a connector extended to have a predetermined length to connect the position adjuster with a corresponding one of the opposite sides of the frame,
   wherein each of the connectors is fitted to the frame by penetrating a corresponding one of the frame covers, and
   wherein each of the frame covers comprises at least one connector insertion hole formed in the widthwise direction for inserting a corresponding one of the connectors.

2. The window shading apparatus according to claim 1, wherein each of the connectors is configured to be connected to the frame via a snap-fit connection.

3. The window shading apparatus according to claim 2, wherein
   each of the connectors comprises a projection protruding in a direction perpendicular to an extending direction,
   wherein the frame comprises a pair of projection accommodating grooves each configured to accommodate a corresponding one of the projections.

4. The window shading apparatus according to claim 3, wherein each of the projection accommodating grooves has a length corresponding to a position adjustable distance so as to prevent the projection from being separated when the connection position of each position adjuster is adjusted.

5. The window shading apparatus according to claim 3, wherein each of the projections protrudes in an outward direction.

6. The window shading apparatus according to claim 2, further comprising a pair of fasteners each configured to fasten each of the connectors and the frame in a state that the connection position of each position adjuster is adjusted.

7. The window shading apparatus according to claim 6, wherein the frame and the connectors comprise fastening holes in which the fasteners are penetrated and inserted, and
   at least one of the fastening holes of the frame and the connectors comprises an elongated hole extended in a lengthwise direction.

8. The window shading apparatus according to claim 7, wherein
   each of the frame covers is provided to surround at least a part of the frame from outside,
   each of the connectors is fitted to an inside of the frame, and
   wherein each of the fasteners penetrates and fastens each of the frame covers, the frame, and each of the connectors.

9. The window shading apparatus according to claim 8, wherein each of the fasteners is configured to be fastened after the connection position of each position adjuster is adjusted to correspond to an error of an individual installation space when installed in the vehicle.

10. The window shading apparatus according to claim 7, wherein at least a part of each of the frame covers is inserted in and fitted to an inside of the frame, or provided to surround at least a part of the frame.

* * * * *